United States Patent [19]
Lawson

[11] 3,891,739
[45] June 24, 1975

[54] METHOD OF FORMING PRECISELY DIMENSIONED APERTURES

[75] Inventor: Richard Lawson, Lafayette, N.J.

[73] Assignee: Ames Rubber Corporation, Hamburg, N.J.

[22] Filed: Oct. 1, 1974

[21] Appl. No.: 511,084

[52] U.S. Cl. ............... 264/155; 264/156; 264/331; 264/DIG. 66
[51] Int. Cl.² .......................................... B29C 17/10
[58] Field of Search ........... 264/155, 156, 134, 321, 264/322, 345, DIG. 66

[56] References Cited
UNITED STATES PATENTS
2,289,177  7/1942  Chandler ........................ 264/156

Primary Examiner—Robert F. White
Assistant Examiner—Willard E. Hoag
Attorney, Agent, or Firm—Nichol M. Sandoe

[57] ABSTRACT

In a method for forming precisely dimensioned apertures in a coating of elastomeric material on the surface of a hollow cylindrical roller of metal or other rigid material having a preformed aperture therein, a heated die of cross sectional shape and dimensions substantially the same as those of the preformed aperture is pushed through the layer of elastomeric material and said preformed aperture to form an aperture in the elastomeric material of roughly the desired size and shape. After a dwell during which the die is reheated, the die is retracted and in passing through the apertures the walls of the aperture in the elastomeric material are smoothed and precisely dimensioned.

3 Claims, 8 Drawing Figures

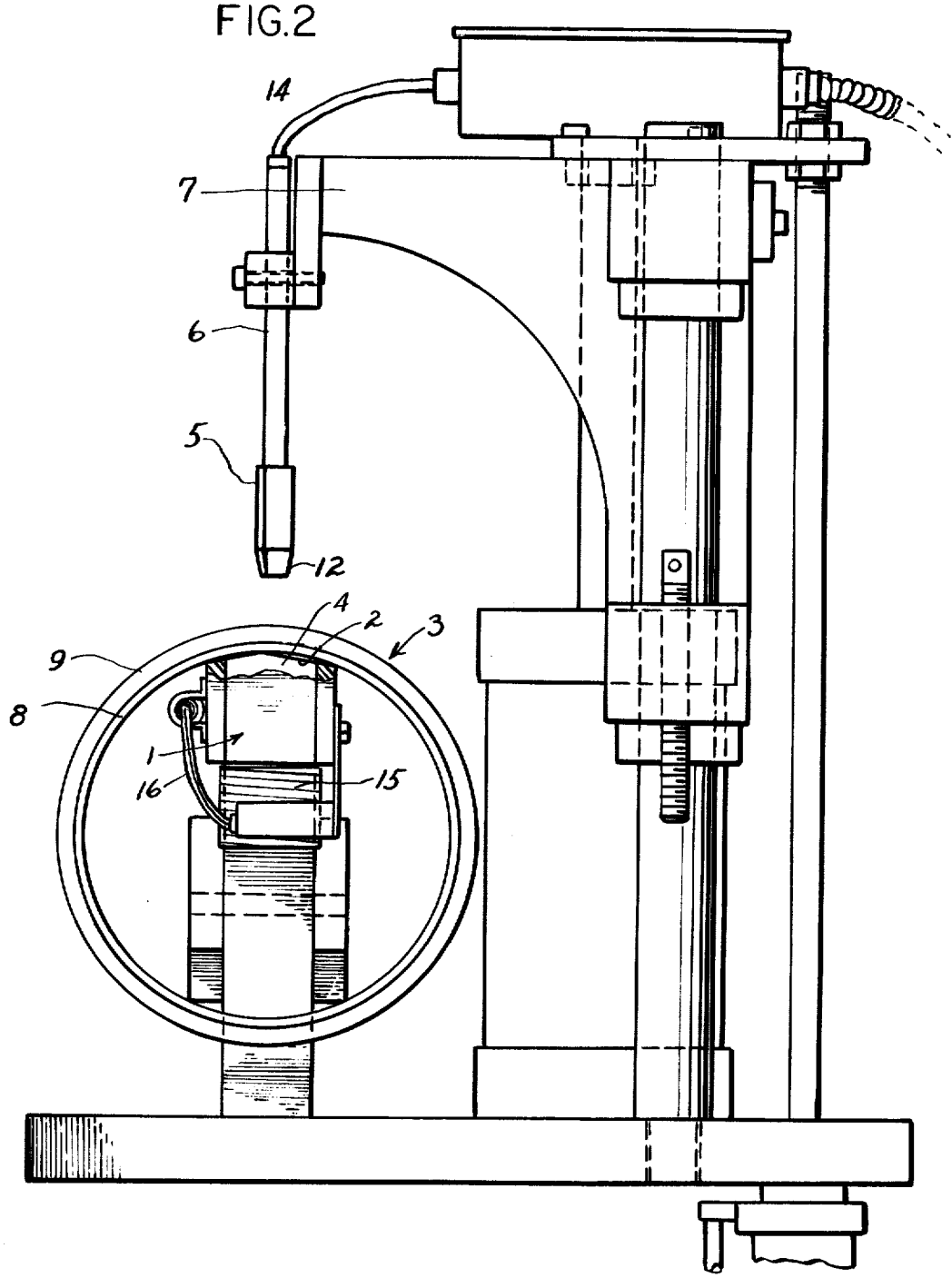

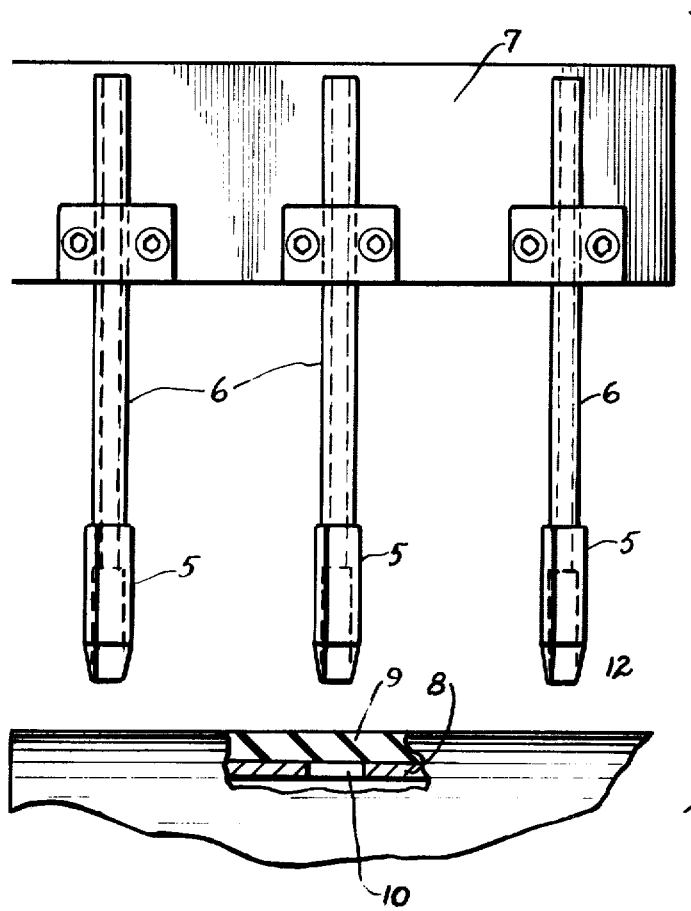
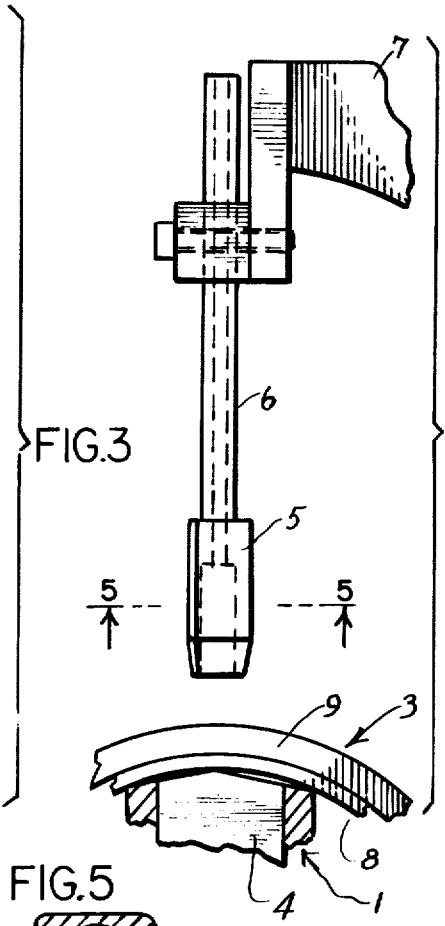
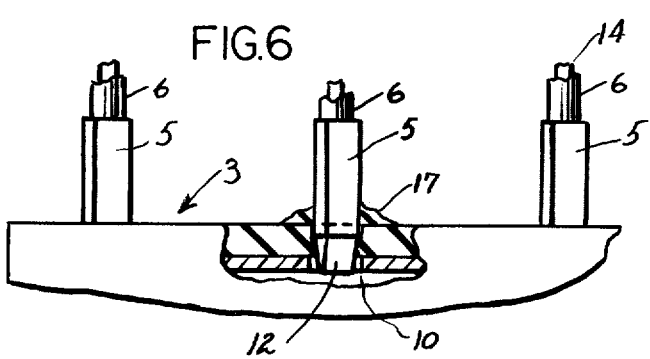
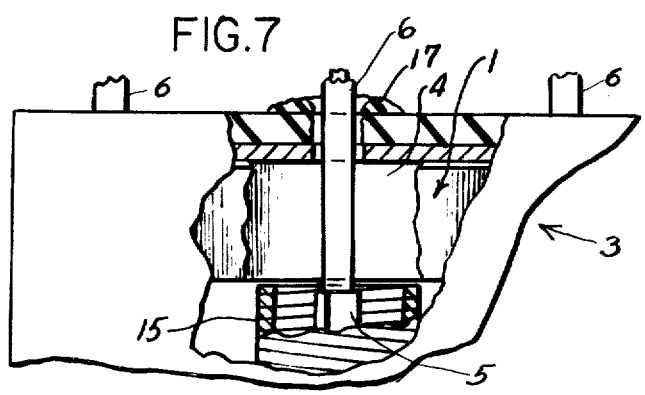
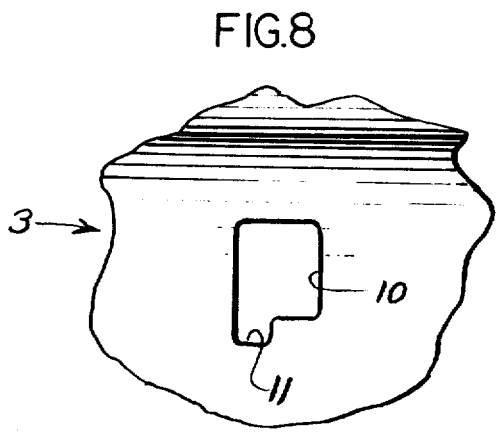

METHOD OF FORMING PRECISELY DIMENSIONED APERTURES

This invention relates to methods of forming precisely dimensioned apertures in a coating of elastomeric material on the surface of a hollow cylindrical roller of rigid material having a preformed aperture therein of given contour and dimensions.

In many types of electrostatic copying machines now commercially available, hollow cylindrical rollers are used to feed copy paper through the machines, which said rollers comprise a hollow metal cylinder, the surface of which constitutes a substrate which is coated with a layer of elastomeric material. In certain types of such machines it is necessary to provide both the substrate and the elastomeric layer with one or more apertures through which, during the operation of the machine, a finger or fingers may be caused to protrude at a certain stage of the rotation of the roller to insure very precise registration of the paper which is being fed by the roller. It is required that the aperture in the elastomeric layer be of precisely the same shape and dimensions as the aperture in the metallic tube and that it be precisely aligned therewith.

In the usual process of manufacture of such rollers, an aperture or apertures of the desired size and contour are first formed in the wall of the metal cylinder and the layer of elastomeric material is applied to the surface of the cylinder thereafter. The formation of precisely dimensioned apertures in the wall of an uncoated metal cylinder presents no particular problem, but when it has been attempted to form one or more apertures in the wall of the elastomeric layer in register with the preformed apertures in the metal cylinder, it has heretofore been difficult to control the dimensions of the apertures in the elastomeric layer within required tolerances without producing undesirable surface defects.

It is an object of the present invention to provide a method of forming one or more precisely dimensioned apertures in such an elastomeric layer and to insure that such apertures have smooth edges and are precisely aligned with the aperture or apertures in the metal cylinder.

The following description of the method will deal with the formation of a single aperture, it being understood that the simultaneous formation of a plurality of apertures involves merely duplication of the cutting dies and associated apparatus as hereinafter described.

According to the present invention, a heated die, the cross sectional shape and dimensions of which are substantially the same as those of the preformed aperture in the metal cylinder, except for slight clearance to enable the die to move through said aperture, is pushed through the layer of elastomeric material lying above the preformed aperture in the metal cylinder, the die being moved a distance sufficient to cause it to pass completely through the layer of elastomeric material and through the preformed aperture in the metal wall. The die is heated to a temperature sufficient to melt the elastomeric material. The movement of the heated die through the elastomeric layer punches out a chunk of elastomeric material by a combined mechanical and thermal action, leaving an aperture of roughly the size and shape of the aperture in the metal wall, but the walls of the aperture so formed are uneven and not precisely dimensioned.

The temperature of the heated die is reduced during its traverse through the elastomeric layer due to heat transfer to the elastomeric material and to the metal cylinders. Therefore, after a dwell period during which the die is reheated up to the desired temperature, the die is retracted to cause it to pass again completely through the layer of elastomeric material in a reverse direction. During this second passage of the die through the layer of elastomeric material, the walls of the aperture are precisely dimensioned and smoothed by the heated die into precise alignment with the edges of the aperture in the metal cylinder.

A preferred embodiment of apparatus suitable for carrying out the method of the invention is shown in the accompanying drawings, in which FIG. 1 is a front elevation of the apparatus with the cutting die carriage shown in its upper position.

FIG. 2 is a side elevation with the cutting die carriage shown in its upper position.

FIG. 3 is a fragmentary front view showing the cutting die carriage partially lowered with the cutting die aligned with the cylinder aperture.

FIG. 4 is a fragmentary side view of the same.

FIG. 5 is a section through a cutting die on the line 5—5 of FIG. 4.

FIG. 6 is a fragmentary front view showing the cutting die penetrating the layer of elastomeric material.

FIG. 7 is a fragmentary front view showing the cutting die in its lower position after emerging from the aperture.

FIG. 8 is a fragmentary plan view of the completed aperture.

Figure 1:
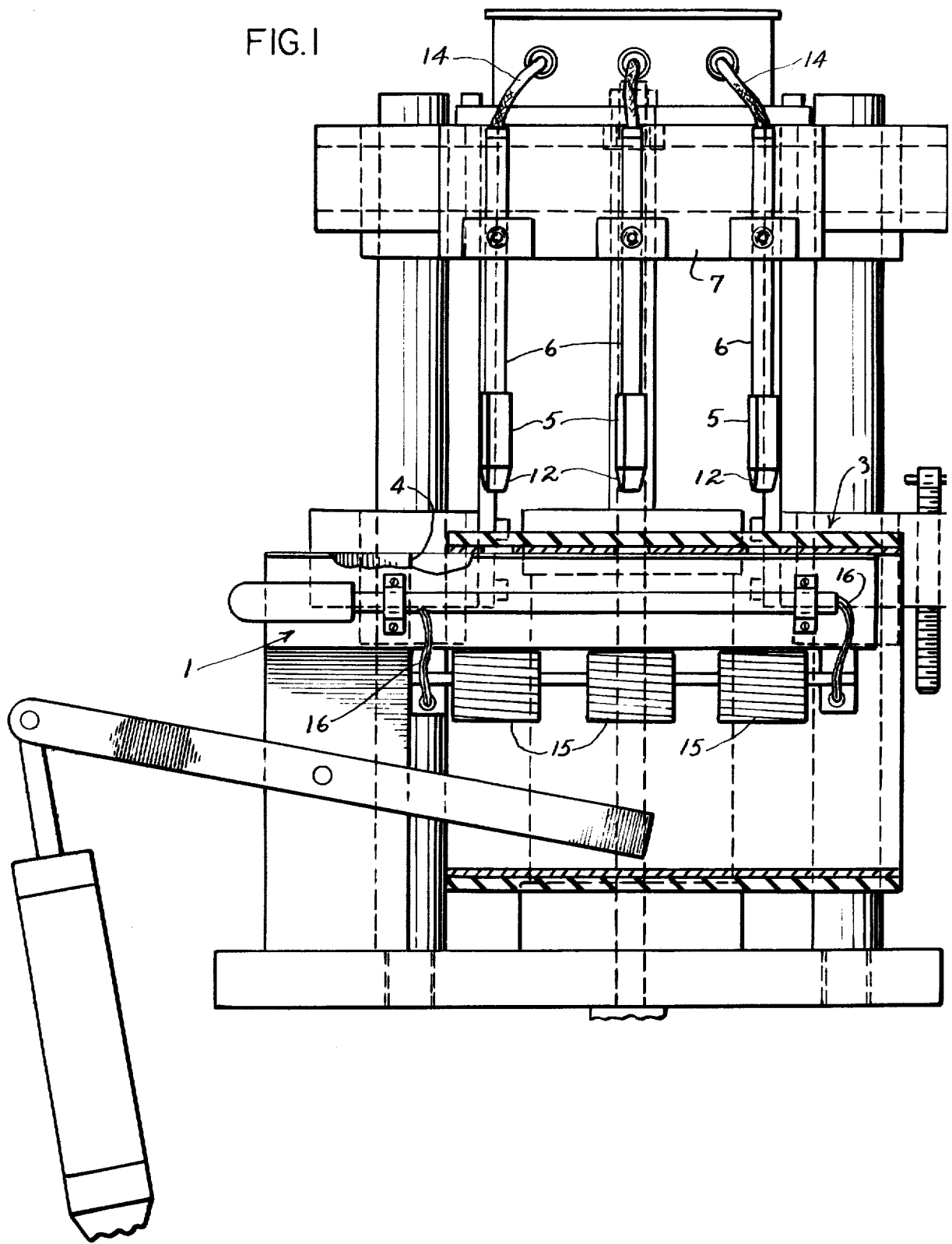

Referring to the drawings, the apparatus illustrated is adapted for the simultaneous formation of three separated apertures although the following description will be directed to the formation of a single aperture. The illustrated apparatus comprises a support bar 1 having an upper surface 2 the edges of which engage the inner surface of the hollow cylindrical roller 3. The support bar is provided with a vertical slot 4 extending through to permit the cutting die 5 to pass freely therethrough. The cutting die 5 is mounted on a rod 6 which extends upwardly for attachment to a reciprocating carriage 7 which may be actuated by hand or by any conventional power driven reciprocating mechanism.

As shown, the cylindrical roller comprises a metal cylinder 8 having an outside layer 9 of elastomeric material applied thereto. The wall of the metal cylinder is provided with a preformed aperture 10. In the embodiment illustrated the aperture is substantially rectangular, but is provided with a short offset extension 11 at one corner as required for the purposes of the machine in which the roller is to be used.

The die 5, in cross section as shown in FIG. 5, is shaped to conform substantially to the contours of the aperture 10 and is similarly dimensioned except to provide sufficient clearance to permit the die to move easily through the aperture 10. The lower side faces of the die are tapered slightly as shown at 12. The interior of the die is hollow and contains an electric heating element 13 connected by leads 14 to a suitable source of current. Mounted below the support bar 1 in any suitable manner is a heating element 15 connected by leads 16 to a suitable source of current. The element is so arranged that it surrounds the die 5 at the end of its downward movement in order to apply heat externally to the die.

EXAMPLE

An example of the practice of the method of the invention will be described with reference to the formation of a precisely dimensioned aperture in a layer of polyurethane having a wall thickness of about 0.250 inch applied to the outside cylindrical surface of an aluminum cylinder having a wall thickness of about 0.125 inch. The die 5 is first heated to a temperature of 850° to 875°F by energizing its heating element 13. When the die has reached the desired temperature, a coated cylinder 3 is placed on the support bar in the manner shown in the drawings with the aperture 10 in the metal cylinder located directly below and in register with the die 5. If desired, the inside surface of the cylinder may be provided with pins (not shown) adapted to engage holes in the support bar to insure accurate registration.

The carriage 7 is now moved downwardly to cause the die 5 to engage and then pass through the layer 9 of polyurethane, and through the aperture 10 with the downward movement continuing until the die has passed through both and has emerged below the aperture 10. As the die passes through the layer of polyurethane a combined mechanical and thermal cutting action occurs which causes a chunk of the polyurethane to be ejected through the aperture 10, leaving an aperture in the polyurethane layer which conforms roughly to the size and shape of the aperture 10. However, the apertures so formed are irregular and not precisely dimensioned. As the die passes through the layer of elastomeric material, some of the material which is melted by the heated die may be forced upwardly and be deposited on the surface as shown at 17. These excrescences may be easily scraped off after they have solidified.

The reforming of the apertures is accomplished during a return stroke of the die during which the heated surfaces of the die engage and reform the surfaces of the aperture to precise shape and dimensions.

During the downward movement of the die the temperature of the die may be reduced considerably by heat transfer to the polyurethane layer and to the metal cylinder. If desired, it is possible to cause the die to dwell in its lower position for a sufficient time to allow its heating coil 13 to bring it again to the desired temperature of 850° to 875°F. However, the dimensions of the die are such as to accommodate only a small heating element which may require a considerable time to reheat the die to the desired temperature. It has been found convenient, therefore, to provide an additional heating element 15 adapted to surround and heat the die externally while it is in its lower position in order to reheat the die more quickly and thus permit the return stroke to be made more quickly.

What is claimed is:

1. The method of forming a precisely dimensioned aperture in a coating of elastomeric material on the cylindrical surface of a hollow rigid roller having a preformed aperture therein of given contour and dimensions, which comprises preheating a die of similar contour and dimensions to a predetermined temperature sufficient to melt said elastomeric material, passing said heated die through said coating and through said preformed aperture to form an aperture in said coating in register with said preformed aperture which conforms roughly to the contour and dimensions of said preformed aperture, reheating said die to said predetermined temperature, and again passing said reheated die through said apertures in the reverse direction to reform the aperture in said coating to the precise contour and dimensions of said preformed aperture.

2. The method of claim 1 in which said predetermined temperature is in the range of 850° to 875°F.

3. The method of claim 1 in which said die is reheated externally.